(12) United States Patent
Fiano

(10) Patent No.: US 7,886,450 B1
(45) Date of Patent: Feb. 15, 2011

(54) ELEVATED LASER BEAM POSITIONING DEVICE

(76) Inventor: Joseph Fiano, 5530 Rushmore St., Ventura, CA (US) 93003

(*) Notice: Subject to any disclaimer, the term of this patent is extended or adjusted under 35 U.S.C. 154(b) by 53 days.

(21) Appl. No.: 12/583,300

(22) Filed: Aug. 17, 2009

Related U.S. Application Data

(60) Provisional application No. 61/211,010, filed on Mar. 24, 2009, provisional application No. 61/142,371, filed on Jan. 4, 2009.

(51) Int. Cl.
*G01C 15/00* (2006.01)

(52) U.S. Cl. .................. 33/286; 33/290; 33/DIG. 21

(58) Field of Classification Search .................. 33/285, 33/286, 227, 228, 290, 296, DIG. 21, 283, 33/613, 644, 809
See application file for complete search history.

(56) References Cited

U.S. PATENT DOCUMENTS

| | | | |
|---|---|---|---|
| 4,177,964 A * | 12/1979 | Hujsak et al. ................. | 33/286 |
| 5,481,809 A | 1/1996 | Rooney | |
| 6,256,895 B1 * | 7/2001 | Akers ........................... | 33/286 |
| 6,594,910 B2 | 7/2003 | Wishart | |
| 6,598,304 B2 * | 7/2003 | Akers ........................... | 33/286 |
| 6,804,893 B2 | 10/2004 | Watson et al. | |
| 6,829,834 B1 | 12/2004 | Krantz | |
| 6,986,209 B2 * | 1/2006 | Cook ............................ | 33/286 |
| 7,174,648 B2 | 2/2007 | Long et al. | |
| 7,441,339 B2 | 10/2008 | Kallabis | |
| 2002/0017028 A1 * | 2/2002 | Wishart ........................ | 33/286 |
| 2002/0174552 A1 | 11/2002 | Akers | |
| 2003/0051355 A1 | 3/2003 | Phuly et al. | |
| 2004/0093748 A1 * | 5/2004 | Watson et al. ................. | 33/286 |
| 2009/0000135 A1 * | 1/2009 | Flowers, Jr. .................. | 33/286 |

\* cited by examiner

*Primary Examiner*—Yaritza Guadalupe-McCall
(74) *Attorney, Agent, or Firm*—Sandy Lipkin

(57) ABSTRACT

A leveling device that facilitates quick and precise placement of laser beams at a standardized distance from the surfaces against which it bears for the purpose of establishing plumb and level reference lines. It includes a mounting platform that includes various methods of bearing and attachment, including a telescoping pole that includes various features for deployment and stabilization. While the device can be used as a conventional level, it is specifically designed to be temporarily attached to vertical surfaces by a variety of methods, enabling all the advantages of laser use for the operation of plumb alignment, and also eliminating the need for a full time attendant.

11 Claims, 7 Drawing Sheets

ELEVATED LASER BEAM POSITIONING DEVICE

REFERENCE TO PRIOR APPLICATION

This application claims the priority of provisional application 61/142,371, filed Jan. 4, 2009 entitled CONSTRUCTION LASER POSITIONING DEVICE by Joseph Fiano and 61/211,010, filed Mar. 24, 2009 entitled ELEVATED LASER BEAM POSITIONING DEVICE by Joseph Fiano.

BACKGROUND OF THE INVENTION

1. Field of the Invention

The field of this invention relates generally to positioning devices and specifically toward a positioning device for elevated laser beams.

2. Description of the Prior Art

Leveling devices are used primarily in the construction industry as an aid to framing carpenters, concrete form setters, tilt-up concrete crews, metal stud installers, and many other "mechanical" trades, as well as finish carpenters, cabinet installers, door hangers, glass installers and the like. Leveling devices are used to insure that the items being positioned or installed are in proper alignment in relation to the earth, and with other aspects of the construction. Traditionally bubble-vial levels are used for leveling in both horizontal and vertical directions. For leveling in a vertical direction, i.e., to make "plumb", the definition of which is a true vertical position or alignment, plumb-bobs are also used. A plumb-bob is a weight, usually with a pointed tip on the bottom, which is suspended from a string and used as a vertical reference line, or plumb-line. Various laser tools project both level lines and plumb, i.e., vertical, lines that can be used to measure both level and plumb.

The use of lasers in vertical positioning is not new. However, there are significant disadvantages in the prior art that prohibit any practical usage. Of particular interest is U.S. Pat. No. 5,481,809 to Rooney. The Rooney device provides a means for producing a plumb laser beam offset from a wall a known distance. It operates specifically and solely with the use of a specially manufactured laser device contained within a conventional plumb bob housing. This device is limited, however, in that it is inherently insecure in any position except an inside corner. Additionally, it is inherently unstable and must be continually hand-held at height, as it is not provided with any means of inherently stable support or suspension. It is subject to disturbance by wind, and is not self dampening as other laser devices are currently available.

It is the primary object of the instant invention to provide an improved device that overcomes the shortcomings of the prior art. In particular, the instant invention provides a device to securely position a plumb laser beam in precise relation to the surfaces against which it bears. Additionally, the instant invention allows for use by only one person with the possibility of keeping both hands free. It is designed to hang or be suspended from walls and other surfaces by a variety of means.

The instant invention seeks to project a laser beam downwards that can establish a perfectly plumb line so that a wall (or any other objects placed at height) can be correctly positioned, i.e., made plumb or precisely positioned in relation to a fixed point, either above or (more commonly) below the object to be positioned. While the main concern with is with walls, to make them plumb, other horizontal construction components such as beams and mechanical components are often positioned from fixed layout points which are made on the floor (or ceiling) of a building. The instant invention is a more versatile and superior alternative to the use of bubble vial levels, and conventional plumb bobs.

Depending upon the capability of the laser instrument being used in the housing of the instant invention, the platform allows for the projection of at least three level beams at three angles: 0, 90 and 180 degrees. It can be used to position offset level laser beams, but is primarily designed to produce plumb laser beams, positioned in relation to a vertical surface.

Most laser instruments that project a plumb beam downwards also project a laser line upward. This upward line will be provided for in the design of the housing, that is it will be visible and usable when the laser is secured in the housing of the instant invention.

The device uniquely positions the laser by securely placing it at the top of the area of work and projecting a beam downwards at a known offset distance away from the surfaces against which it is bearing.

SUMMARY OF THE INVENTION

The preferred embodiment of the present invention teaches a self-spacing laser mounting platform/housing that can utilize various methods of attachment and stabilization. It is designed to be deployed at height, utilizing a specially designed telescoping pole and highly versatile hanging mechanisms that can be positioned on walls or other surfaces at height (e.g. structural beams, ventilation ducts, etc).

The instant invention describes a positioning device for an elevated laser comprising a housing, being a multi-sided polygon, symmetrical about a central axis, having a top portion, a bottom portion and four or more walls, said combination creating an inner chamber; a mounting platform in said interior chamber of said housing for the placement thereon of a laser; means for securing said laser on said mounting platform; one or more apertures in said walls of said housing that allow for the projection of a laser beams therethrough emanating from said laser; a telescoping pole attachable to said bottom portion of said housing; one or more hanging apertures on said walls of said housing; and an extendable rotatable hanger attached to said top portion of said housing.

The above embodiment can be further modified by defining that the telescoping pole further includes stand off devices and fastener sleeves that allow for said telescoping pole to be attached to a wall or other bearing surface that is being made plumb.

The above embodiment can be further modified by defining that the device is attachable to wall through screws or nails fitting through said one or more "hanging" apertures in the housing walls.

The above embodiment can be further modified by defining that the housing has eight walls wherein four main walls are separated by four bearing surfaces, including two front bearing surfaces and two rear bearing surfaces.

The above embodiment can be further modified by defining that one or more of said main walls further includes one or more rotatable, extendible tabs that can extend the length of said one or more walls of said housing to provide more wider and more secure bearing.

The above embodiment can be further modified by defining that the each set of four bearing surfaces (front and rear) are on a spherical arc wherein the center of said arc is the origination point of the projection of a laser beam downward.

The above embodiment can be further modified by defining that the two rear bearing surfaces are oriented vertically straight down from the corner points formed from said eight walls.

The above embodiment can be further modified by defining that the bearing surfaces have been textured to prevent unintentional horizontal sliding movement.

The above embodiment can be further modified by defining that the laser beam emanating from said laser is at a fixed offset distance from the surface or surfaces upon which it rests.

The above embodiment can be further modified by defining that the some of the walls of said housing taper inward as they extend toward said bottom portion, to provide better visibility from below, to ensure that correct placement of the device has been achieved.

The above embodiment can be further modified by defining that there is a notch built into said top portion to allow for accurate secure placement of said device on an outside corner of a wall or other objects.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF A PREFERRED EMBODIMENT

Figures 1, 2:
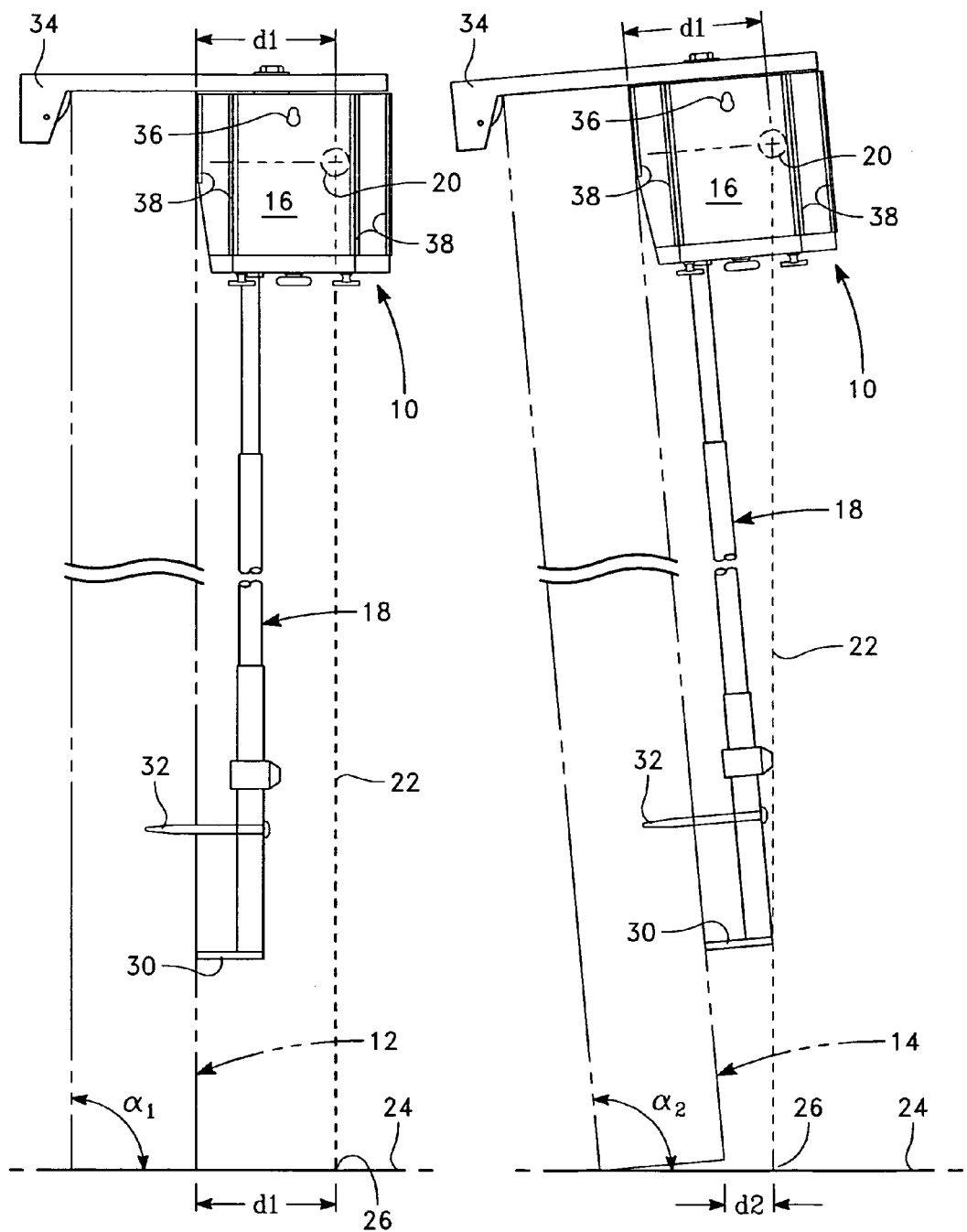
FIG. 1 is a side view of the device of the instant invention as it rests against a plumb wall.
FIG. 2 is a side view of the device of the instant invention against a non-plumb wall.

The instant invention discloses a specially shaped housing that acts as a platform that is attached to the upper end of a telescoping pole. The platform provides a specially designed secondary housing for the laser instrument, enabling it to be positively positioned in order to project laser beams at standardized offset dimensions, both vertically and horizontally. The device can be handheld against a wall. It can also be stabilized by various methods. One of the main features, however, is the specially designed hanging apparatus. The hanging apparatus is designed to secure the housing to the top of wood framed walls, or other types of columnar assemblies. It is uniquely designed to span all common wall widths, and work in all common wall configurations (straight and curved walls, 90 degree inside and outside corners, and 135 degree inside corners). These various methods of hands-free attachment and stabilization provide the distinguishing feature of the instant invention. The multi-functional housing in combination with the hanging apparatus is the main feature of the instant invention.

There is a combination target device and marking template that is the same shape as the housing and is designed to be placed on the floor. It has an integral folding wing that provides shade on the target, thereby increasing the visibility of the laser. The target also serves as a marking template with cut-outs that can be used to produce a handwritten "X" target mark on the floor surface quickly and accurately. Special highly reflective marking pens could be used to enhance the visibility of the target mark when struck by the laser.

The laser projector itself could be a standard, major manufacturer-produced, compact sized, self-leveling laser. These lasers project a plumb (vertical) beam (or plane) and are readily available on the market. The device of the instant invention could also support multi-beam lasers, thereby allowing full functionality of the each different device's capabilities.

The invention is a highly mobile mechanical positioning device that facilitates quick and precise placement of vertical (and horizontal) laser beams a known distance from the surface(s) against which it bears, at elevations up to ~20 feet above the floor. The device will support several different manufacturers' compact laser instruments that project vertical (and horizontal) beams. However, it could also be specially manufactured with an integral laser device as part of the housing. Such a "purpose built" laser and housing combination will likely be the preferred embodiment of the device as it is refined. The housing and laser would be one unit in this design/manufacturing configuration. The platform could have several different types of precisely shaped bearing surfaces. The bearing surfaces are key features of the device. The bearing surfaces allow the device to positioned against outside corners, inside corners and on straight sections of walls in stable configurations, thereby assuring positive placement and producing precise positioning of the laser beam.

An integral part of the device is a telescoping pole. A stand-off device is attached to the bottom of the pole, which holds the pole parallel to the wall when it is resting against it. This allows the device to be secured in position against a wall or any vertical surface. The device can also be quickly and easily placed temporarily by use of the pole, against the surfaces to be measured.

The mounting platform is secured in place temporarily by several methods. It is primarily designed to be hung over wood framed walls, but several methods of deployment are available. It can be conveniently fastened to a wall by screws or nails through holes in the basket walls and through specially designed sleeves on the telescoping pole. The mounting platform can also be hung from a single point by means of a integral wire hanger (not illustrated). Different types of specialty hanger devices (not illustrated) can also be easily attached providing for secure positioning of the basket and pole assembly from all sorts of structures, including structural steel, concrete and masonry walls, machinery, and millwork, etc.

The housing has rotating extendible steel tabs at the top, by which it can be stabilized on top of a wall or any horizontal surface. The tabs are designed to be employed as outriggers, which will increase the spread of the bearing points, thereby allowing for a more stable bearing against a surface.

It is to be understood that the basket portion of the device does not necessarily need walls, nor does it need to be completely enclosed.

There are many advantages to the use of the instant invention. The way that the mounting platform is constructed allows plumb to be determined in two axes at once, with only one positioning of the device. This is not possible with a bubble-vial type level.

There is potential for one-man operation using this device. Once the mounting platform is positioned, the wall or walls can be moved to align the laser beam with a target on the floor and then secured by one person. This is not possible with a bubble type level, which requires one person to read the level while another moves the wall or walls.

The advantages of a laser plumb line over a bubble vial are many. There is more precision and less subjectivity in interpreting readings. Error readings are much more easily measured using a laser plumb line. The distance from the reference mark to the laser beam dot can be easily and precisely measured. A bubble level user tries to hold the level plumb while "eyeballing" the gap thus created to obtain an error measurement estimate. Otherwise, an assistant is required to measure it, making it a two man operation.

The mounting platform of the instant invention can be used to project a laser beam up, down, and on level 90 degree angles.

The offset of the laser beam from its bearing surface(s) enables it to project a plumb beam around surface irregularities in the wall, such as bowed studs. In fact, the laser beam is offset sufficiently to shoot around 2×4 "strong backs", which can then be left nailed onto larger and higher wood framed walls, to help keep them straight during the course of construction operations.

As compared with a conventional plumb bob, the instant invention is much easier and faster to deploy. Additionally the laser beam is advantageous to conventional plumb bob, as it is unaffected by wind and is automatically dampened almost instantly.

Laser target-marks which are made on the floor for initial "plumb and line" operations can be easily reused during the entire course of construction, so that whenever the walls need to be verified for plumb, the operation will be as simple as placing the mounting platform in the same position used originally, to verify that the laser beam is still hitting the target mark. This verification procedure is regularly practiced in construction, primarily for assurance of quality construction. However, it is also used after any event has occurred that may cause walls to be moved out of plumb. Examples include impacts by forklifts, braces being removed prematurely, framing modifications, and the possibility of movement due to prolonged or severe exposure to the elements, especially wind and rain.

A bubble level user needs to align his eye squarely to the vial while carefully keeping both bearing surfaces in contact with the wall. This type alignment procedure allows for more error readings. Additionally, a bubble level can be inaccurate, but the procedure for checking and adjusting multiple vials on multiple levels is too seldom used. When the laser beam is on target it can be very easily visually verified by anyone in the vicinity.

The mounting platform, including the telescoping pole, is lighter, more maneuverable and therefore quicker to use than the bubble type levels.

The instant invention, in comparison with a stand-alone laser instrument, is a completely developed system of laser positioning and targeting with several superior methods of use that make it uniquely efficient, highly adaptable and versatile.

The mounting platform can be pre-attached by various means, such as screw holes and light hangers. For example, two devices could be easily hung on concrete tilt up walls or panelized wood walls while on the ground, before lifting. This then allows for the immediate projection of a vertical laser beam down for use in plumb and line operations as soon as they are erected. The hanging pole then provides a quick and convenient way of removing the laser when it is prepositioned or suspended at heights. Highly valuable time can be saved, since, typically, crews involved these kinds of operations are large, and expensive crane time and other heavy equipment is always involved. Money is saved through the reduction of the need for the use of crew hours, expensive crane time, and other equipment.

Turning to the drawings, the preferred embodiment is illustrated and described by reference characters that denote similar elements throughout the several views of the instant invention.

Referring particularly to the drawings, there is shown the various aspects of the invention. FIGS. 1 and 2 show the device 10 in side view as it rests, in FIG. 1, against a plumb wall 12, while FIG. 2 shows the device 10 as it rests against a non-plumb wall 14. The housing 16 is specially shaped for its particular use and is also referred to herein as a platform or basket. It is attached to the upper end of a telescoping pole 18. The housing 10 acts as a specially designed secondary housing for the laser instrument 20, enabling the laser instrument 20 to be positioned to project standardized offset laser beams 22. The telescoping pole 18 provides the ability to place and secure the housing 16 at height easily and quickly. Various methods of hands-free attachment and stabilization are the essence of the instant invention.

When the device 10 is placed against a plumb wall 12, the angle of the wall 12 the ground 24 is substantially perpendicular and labeled as $\alpha_1$. In FIG. 2 where the non-plumb wall 14 is illustrated the angle between the non-plumb wall 14 and the ground 24 is different than with the plumb wall 12 and is labeled as $\alpha_2$. $\alpha_2$ could be less than $\alpha_1$ or greater than $\alpha_1$, but in either case, when these two angles are significantly different, the device shuts off and no laser line 22 is projected. If the difference is within tolerance, it will be easy to measure the offset distance from the wall to determine whether or not it is plumb.

The vertical laser lines 22 shown in FIGS. 1 and 2 indicate where the target 26 would end up. The distance $d_1$ defined in FIG. 1 is offset correctly. In FIG. 2 it is shown and illustrated by $d_2$ how when the laser angle is sufficiently out of plumb, the distance marked would be incorrect. This outcome is avoided because the device 10 automatically shuts off when so far out of plumb. A "laser plumb bob" either projects a plumb line when the instrument is properly positioned, within a limited range, or projects no laser line at all. The line 28 shown in FIG. 2 is what is needed to correct the distance required from the wall. When using the device, the failure at this angle would be an indication that the wall is significantly out of plumb. FIG. 2 is exaggerated for illustration purposes.

One of the methods of securing the housing in place is illustrated in FIGS. 1 and 2. The device 10 can be attached to a wall 12, 14 at convenient reachable heights by installing screws 32 through specially designed sleeves through the telescoping pole 18 (located, but not illustrated, at screw 32). The stand off device 30 and sleeves (at screw 32) are located at/near the bottom of the pole to provide easily reachable access to attach and detach the pole 18 with screws 32. Locating the screwed attachment sleeve at a point slightly above the bottom of the pole 18 creates a force that helps to pull the basket 16 into the wall or corner to which the pole 18 is fastened.

The pole 18 can be attached to the housing 16 through a swivel attachment (not shown) that will both allow and limit the range of motion to place the housing 16 against the bearing surfaces easily and accurately.

An additional feature that is not illustrated is the capability of positioning the housing magnets incorporated into the walls of the housing 16, which will hold the side of the housing to a ferrous metal surface.

Figure 3:
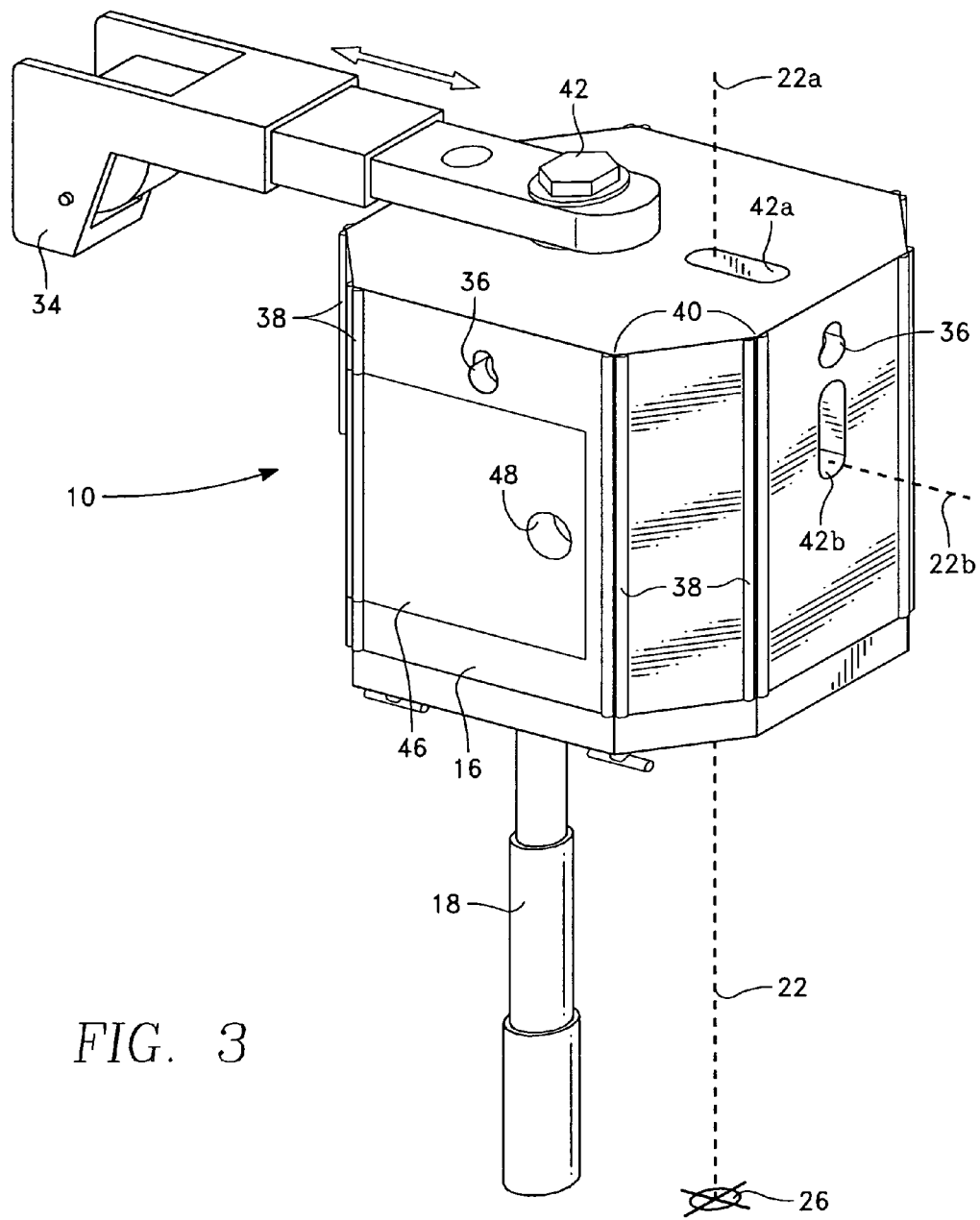
FIG. 3 is a top perspective view of the device.

In FIG. 3, there is illustrated a top perspective view of the platform 16 of the invention. By use of the telescoping pole 18, the platform 16 can also be secured in place with an extendable rotatable hanger 34 which allows the housing 16 to be hung off of the top of walls. The telescoping pole 18 can be used to provide an easy means of hanging and retrieving the basket 16 suspended at height by the hanger 34. The hanger 34 allows the laser housing 16 to be quickly hung over walls. The use of the heavy hanger is usually preferred for use in framing. The hanger 34 is made of a heavy material, with tensioning and wedge type devices, designed to pull and hold the platform 16 into position on the wall.

Also seen in FIG. 3 are the apertures 36 that allow for the platform 16 to be fastened to a wall by hanging from a screw or nail from the apertures 36 provided.

Also shown in FIG. 3 is a target mark 26 being struck by the laser line 22. An optional target template piece (not shown) can also be used as a laser target when it is placed on the floor, producing the same exact offset dimensions as the laser housing 16 above it. The target template can also be used as a marking template through specially shaped cut-outs, to produce a hand-marked "X" target mark 26 (not illustrated) on a floor surface quickly and accurately. Special marking pens could also be used to enhance the visibility when the target is struck by the laser. The target/template is also able to stand vertically to serve as a shading device for the laser target area. The target/template feature is useful in many situations, especially when it is being used over a finished floor surface where it is not possible to make a target mark directly on the floor.

Also seen in FIG. 3 are bearing pads 38 which are located on the corners of the housing 16 and are located in precise relation to the laser beam projection point. The use of discreet bearing pads 38, rather than a plane surface, avoids problems with surface irregularities that are common in construction. The bearing pads 38 can be easily placed to avoid common protrusions, including nail heads, wood splits, hardware and the like. These irregularities will be made visible from below, so that positive placement can be visually verified. The shape of the bearing pads 38 is of critical importance. It is most functional to shape the front set of them on a spherical arc, with the center of the arc being the originating point of the laser beam projection downward, i.e., at the prism. The arc's angular range of bearing does not exceed the laser's tolerance to project a plumb line, which is typically about 3 degrees from level. The rear bearing pads are simply straight vertical projections from the octagonal corner points 40 of the housing 16. These straight pads are typically employed when the housing 16 is pre-hung on a wall using screws or the hanger options. The bearing pads 38 utilize a textured surface to provide friction. The pads 38 will need to be easily slide-able in a vertical direction to allow the housing to easily settle into position, but resist horizontal movement. Vertical grooving/textures on the pads 38 can help produce these capabilities.

In FIG. 3, the apertures for the laser beams 42 are seen. As can also be seen, the laser beam 22 can emanate in both a vertical and a horizontal direction. Optional beams are designated as 22a and optional exits from the housing of the beam are designated as 42a. The hanger 34 is bolted 44 to the top of the housing 16. The outrigger panel 46 is also visible in this view. This panel 46 includes its own aperture 48 that allows for the emanation of a laser beam as well.

Figure 4:
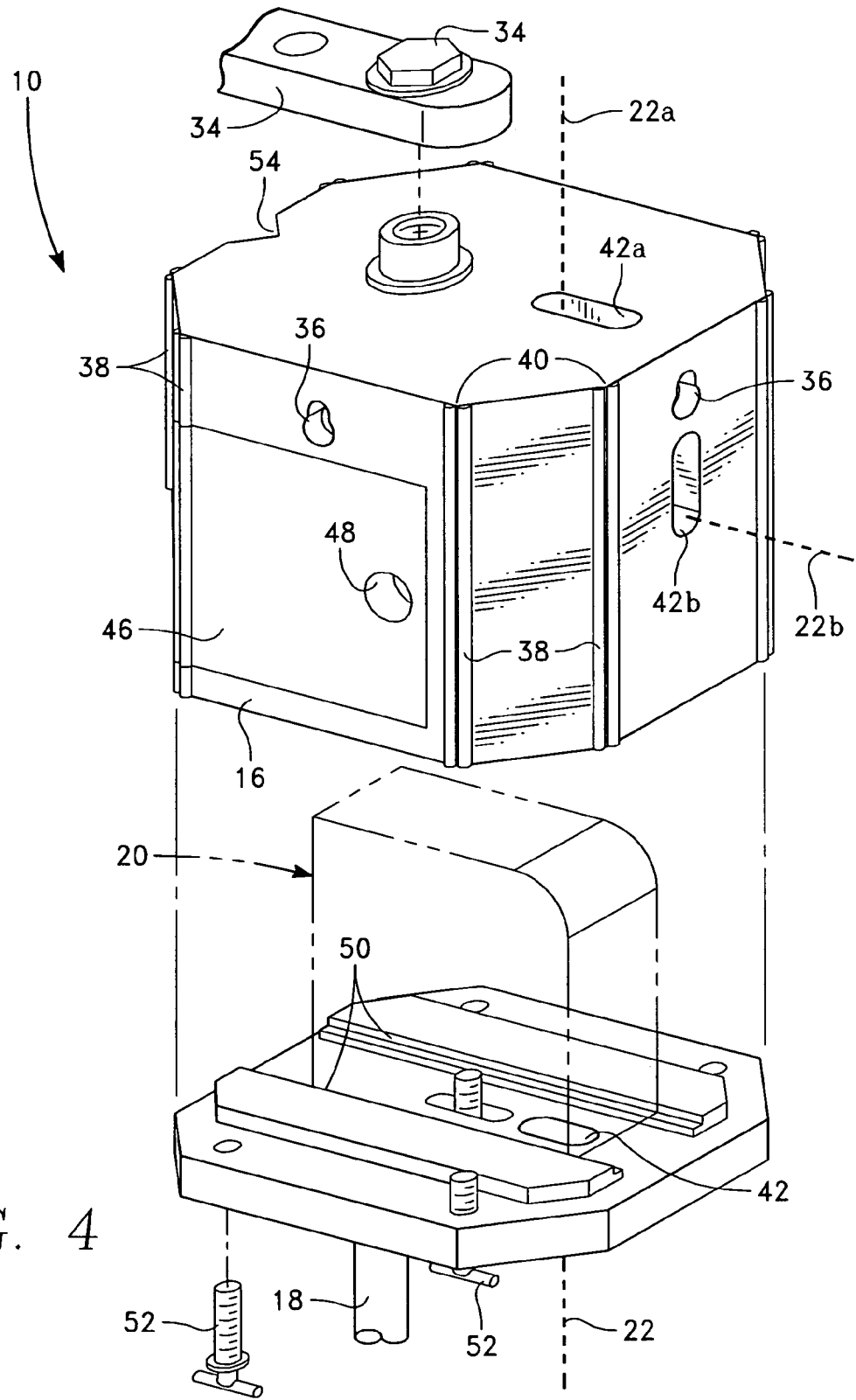
FIG. 4 is a top exploded perspective view of the device.

In FIG. 4 we see an exploded version of FIG. 3. In addition to what can be seen in FIG. 3, in FIG. 4 we can see the laser instrument 20 as it is mounted on the laser mount inside the housing 16. The laser beam generator can be any number of different major manufacturer produced, compact sized, and self-leveling instruments that provide a plumb beam. Multi-beam lasers are also supported by the device 10. A mounting slot 50 is used rather than a single hole. The slot 50 is designed for the typical quarter-inch mounting bolt used on laser instruments. A slot 50, rather than a hole, allows for the use with many different lasers. It also allows for adjustment of the laser beam to be either the standard offset dimension or a user-selected offset dimension.

A clamping mechanism 52 is designed inside the base of the platform 16 to secure the laser instrument 20 in a fixed position and accurately lock in the beam location. The clamping mechanism 52 is also designed to move so as to adjust the center of gravity of the housing 16 as needed. The shape of the platform walls allows for secure and accurate placement against almost any vertical surface. A multi-sided polygon symmetrical about a central axis is the most efficient shape. However, a circular shape could also be effectively used, but would require a larger overall size of the platform 16.

The eight-sided parallelogram shape of the platform 16 is designed to fit into 90 and 135 degree corners and onto 270 degree outside corners, with the laser beam located in a fixed offset distance away from both surfaces simultaneously. From three inches down, which is the typical height of 2-2× "top plates" used in wood wall framing the basket 16, the device is tapered inward to allow visual inspection of the bearing pad placement against the plates 38. A notch 54 is provided in the basket 16 for stable precise placement against outside corners.

Figure 5:
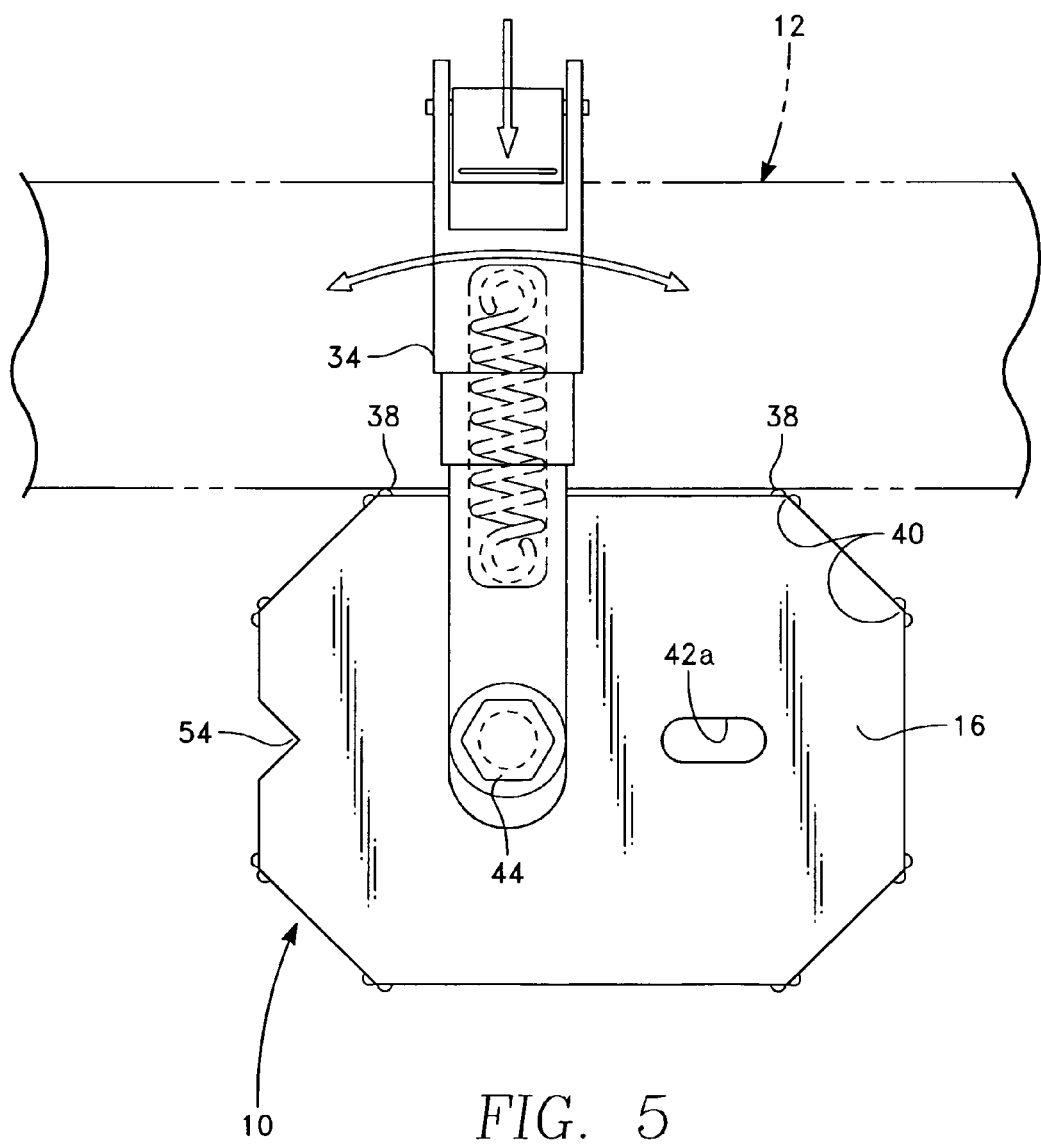
FIG. 5 is a top view of the device as it sits against a single wall in one of several (4) possible positioning configurations.

FIG. 5 is a top view of the device 10 when using the hanger 34 for securing to a wall 12. As can be seen here, the arm 34 is rotatable, so that any of the 8 sides of the housing can be placed against a wall and be held in place by the hanger.

Figure 6:
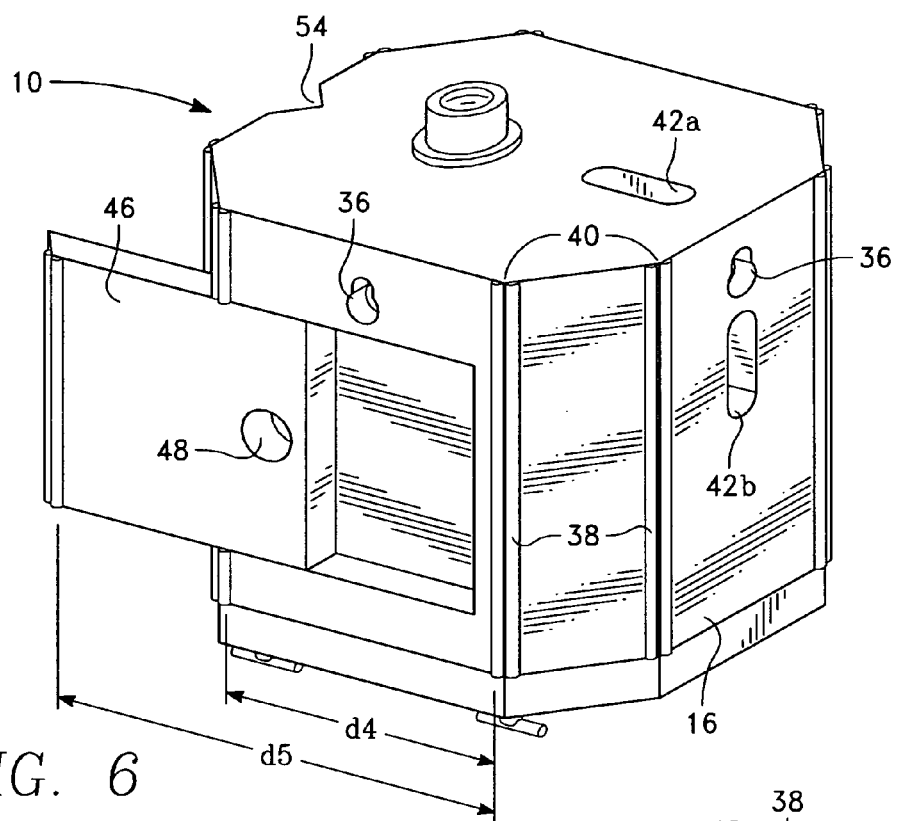
FIG. 6 is a side perspective view illustrating the outrigger panels of the housing of the instant invention.
Figure 7:
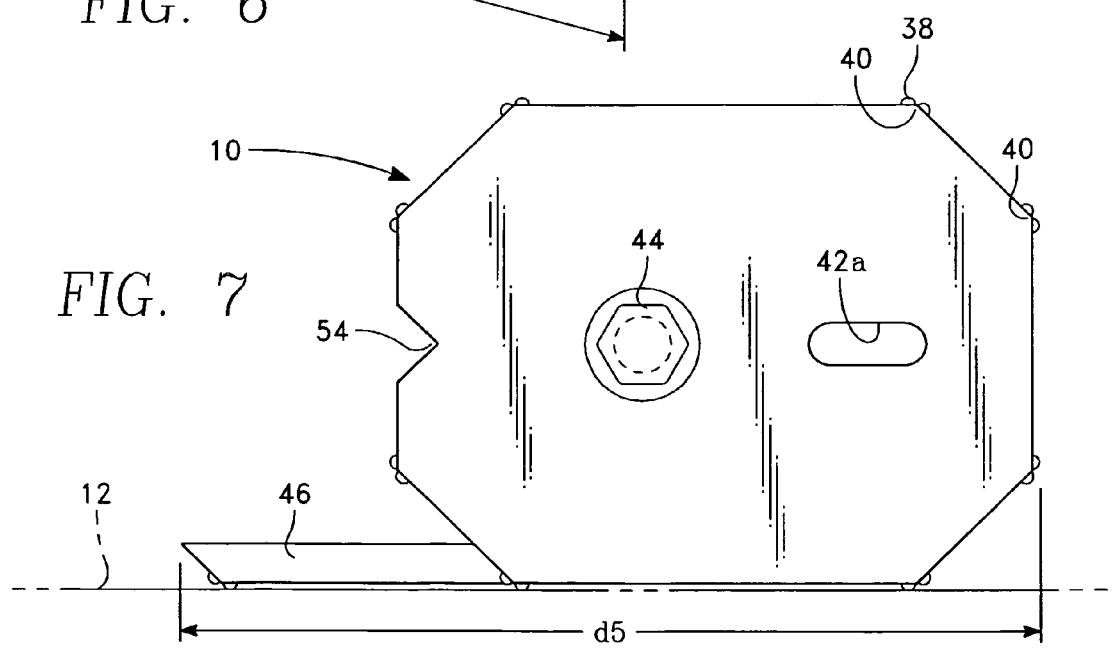
FIG. 7 is a top view of the outrigger panels of the housing of the instant invention as it is placed against a wall.

FIGS. 6 and 7 illustrate the use of the outrigger panel 46. FIG. 6 is a perspective view while FIG. 7 is a top view. The outrigger panel 46 can be extended to change the offset distance from the $d_4$ illustrated by the closed panel to a larger distance $d_5$. These outriggers 46 provide a longer baseline to bear against a wall or surface in the leaning position. This feature is useful when the device 10 is extended to greater heights and in windy conditions.

Figure 8:
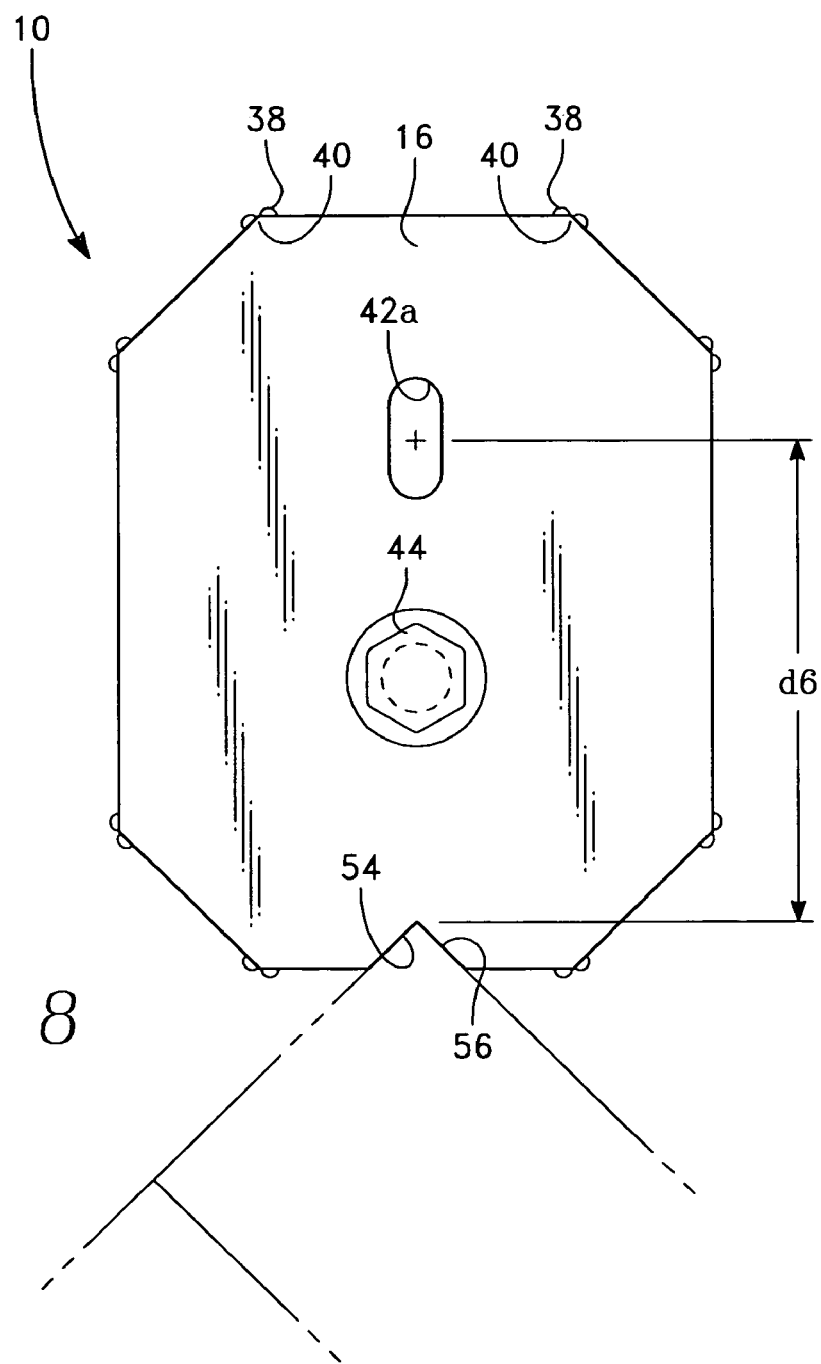
FIG. 8 is a top view of the device as it is placed against an outside corner.
Figure 9:
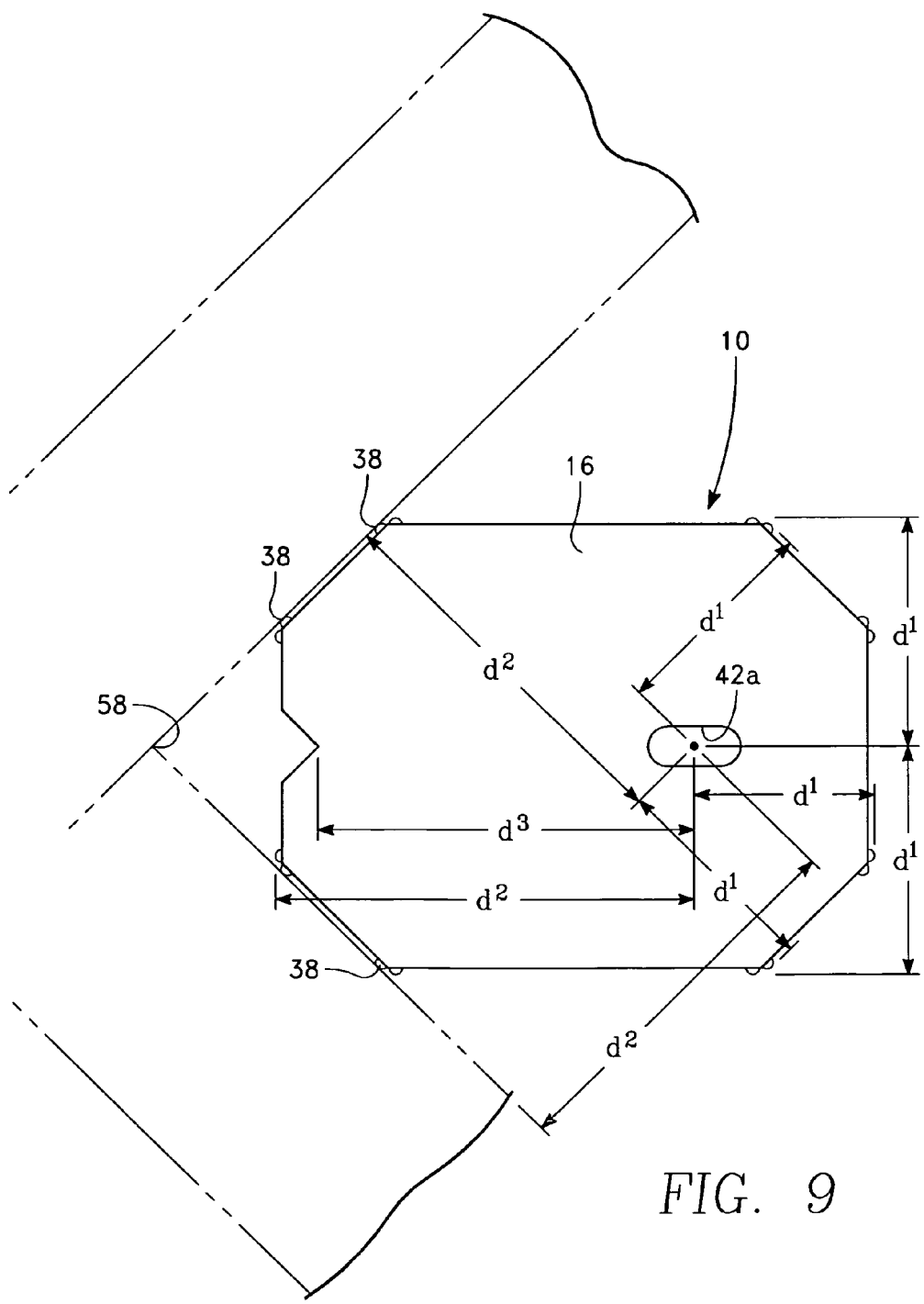
FIG. 9 is a top view of the device as it is placed against the inside of a corner.

FIG. 8 illustrates the device 10 up against a corner 56, fitting with the notch 54. The offset distance $d_6$ is measured from the laser instrument to the edge of the platform 16. FIG. 9 illustrates the device in an inside corner 58. As can be seen, there are three different offsets, creating nine different directions, but only three different dimensions.

Optional features include a beam detector with audio signal that can be implemented on the target/template. Additionally, the housing 16 can be used as a stand-alone housing for the laser instrument 20 along with all of its integral features by simply removing the pole and/or hanger as needed. Protection from impacts to the laser instrument is provided with protective padding that is employed to cushion the laser within the housing once it is adjusted to the desired offset dimensions and mechanically secured.

The discussion included in this patent is intended to serve as a basic description. The reader should be aware that the specific discussion may not explicitly describe all embodiments possible and alternatives that are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A positioning device for an elevated laser comprising
   a housing being a multi-sided polygon symmetrical about a central axis having a top portion, a bottom portion and four or more walls, said combination creating an inner chamber;
   a mounting platform in said interior chamber of said housing for the placement thereon of a laser;
   means for securing said laser on said mounting platform;
   one or more apertures in said walls of said housing that allow for the projection of a laser beam therethrough emanating from said laser;
   a telescoping pole attachable to said bottom portion of said housing;
   one or more hanging apertures on said walls of said housing; and
   an extendable rotatable hanger attached to said top portion of said housing.

2. The positioning device as defined in claim 1 wherein said telescoping pole further includes attachment sleeves that allow for said telescoping pole to be attached to a wall or other bearing surface that is being made plumb.

3. The positioning device as defined in claim 1 wherein said device is attachable to wall through screws or nails fitting through said one or more hanging apertures.

4. The positioning device as defined in claim 1 wherein said housing has eight walls wherein four main walls are separated by four bearing surfaces, including two front bearing surfaces and two rear bearing surfaces.

5. The positioning device as defined in claim 4 wherein one or more of said main walls further includes one or more rotatable, extendible tabs that can extend the length of said one or more walls of said housing.

6. The positioning device as defined in claim 4 wherein said two front bearing surfaces are on a spherical arc wherein the center of said arc is the origination point of the projection of a laser beam downward.

7. The positioning device as defined in claim 4 wherein said two rear bearing surfaces are oriented vertically straight down from the corner points formed from said eight walls.

8. The positioning device as defined in claim 4 wherein said bearing surfaces have been textured/roughened to prevent horizontal movement.

9. The positioning device as defined in claim 4 wherein said walls of said housing taper inward as they extend toward said bottom portion.

10. The positioning device as defined in claim 4 wherein there is a notch built into said top portion to allow for accurate placement of said device on the outside of a corner.

11. The positioning device as defined in claim 1 wherein the laser beam emanating from said laser is at a fixed offset distance from the surface or surfaces upon which it rests.

* * * * *